April 6, 1943.  H. W. WHITE  2,315,569
DASHPLATE COMPARTMENT TAXIMETER
Filed Oct. 15, 1938  6 Sheets-Sheet 1

Inventor
Henry W. White
Jesse R. Stone
&
Lester B. Clark

Attorneys

April 6, 1943.　　H. W. WHITE　　2,315,569
DASHPLATE COMPARTMENT TAXIMETER
Filed Oct. 15, 1938　　6 Sheets-Sheet 3

Henry W. White Inventor
Jesse R. Stone
Lester B. Clark
By
Attorney

Inventor
Henry W. White
Jesse R. Stone
& Lester B. Clark
Attorneys

Patented Apr. 6, 1943

2,315,569

UNITED STATES PATENT OFFICE 2,315,569

DASHPLATE COMPARTMENT TAXIMETER

Henry W. White, Houston, Tex.

Application October 15, 1938, Serial No. 235,226

5 Claims. (Cl. 235—30)

This invention relates to taxi meters for use on taxicabs employed in public service.

It is an object of the invention to provide a taxi meter of light and compact construction and formed to be inserted and housed within the usual glove compartment of the motor vehicle.

It is a further object of the invention to provide a taxi meter of this character which when in position may be enclosed and sealed in such manner that it can not be tampered with.

It is a further object of the invention to provide a taxi meter which may be adjusted to operate in response to the running of the vehicle or to the running of a clock or time control apparatus, or both of them, whenever the taxicab is in service.

It is a further object of the invention to provide an efficient mechanism for indicating the operation of the taxicab, said mechanism being housed and inaccessible.

It is a further object of the invention to provide a construction which may be operated from the speedometer shaft and to so house the connection between said shaft and the indicating mechanism that it will also be inaccessible and tamper proof.

My invention lies largely in the general construction and arrangement of my improved apparatus and will be better understood from a description thereof taken with the drawings forming a part of this application.

The features of incorporating the meter in the glovebox and flush with the dash board of the car and other details originally disclosed are being claimed in a divisional application, Serial No. 471,862, filed Jan. 9, 1943.

The housing for the meter box consists of flat plates which form a rectangular enclosure adapted to fit within the glove compartment of the car. This housing fits about a frame upon which the mechanical structure within the housing is supported.

Figure 4:
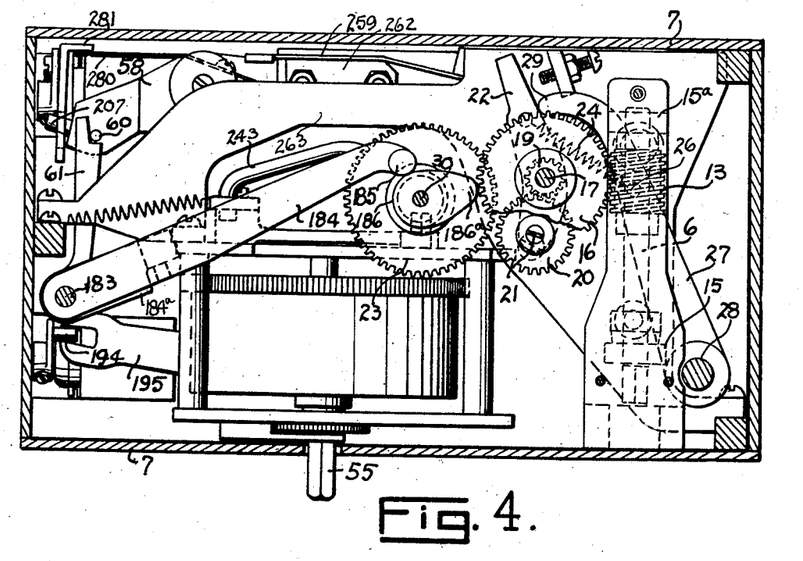
Fig. 4 is a section taken approximately on the plane 4—4 of Fig. 1.

The worm gear 13 is mounted upon a shaft 6 and is driven in any suitable manner by the vehicle upon which the taximeter is installed. This worm gear is adapted to operatively engage with a gear wheel 16. Said gear wheel 16 is mounted upon a shaft 17 rotatable within a bushing 18, which is supported upon the side plate of the housing 7. The said shaft projects beyond the gear 16 and has at its inner end a smaller gear 19 which is in turn adapted to engage with a gear 20 as best seen in Fig. 4.

Said gear 20 is mounted upon a shaft 21 supported on the end of a curved lever 22. Said lever 22 is pivoted upon the shaft 17 upon which the gear is rotatable and from Fig. 4 it will be seen that when the lever 22 is moved the gear 20 may be brought into or out of engagement with an adjacent gear 23. Due to the fact that the lever 22 is pivoted on the shaft 17 the gear 20 is constantly in mesh with gear 19, and when the gear is moved to the left of its position in Fig. 4 it will engage the gear 23. The spring 24 is attached to a pin 25 upon the lever 22 and at its other end is secured to a stationary pin 26 on the lever 27. This spring exerts a tension on the lever 22 tending to draw it into position with the gear 20 engaging with the gear 23.

The lever arm 27 is secured in fixed position upon a cam-operated shaft 28, said lever being curved forwardly at its upper end, and said end 29 bears against the lever 22 and tends to hold the spring 24 under tension and the gear 20 out of contact with the gear 23. The operation of the lever 27 in its sequence will be later described.

Figures 5, 8:
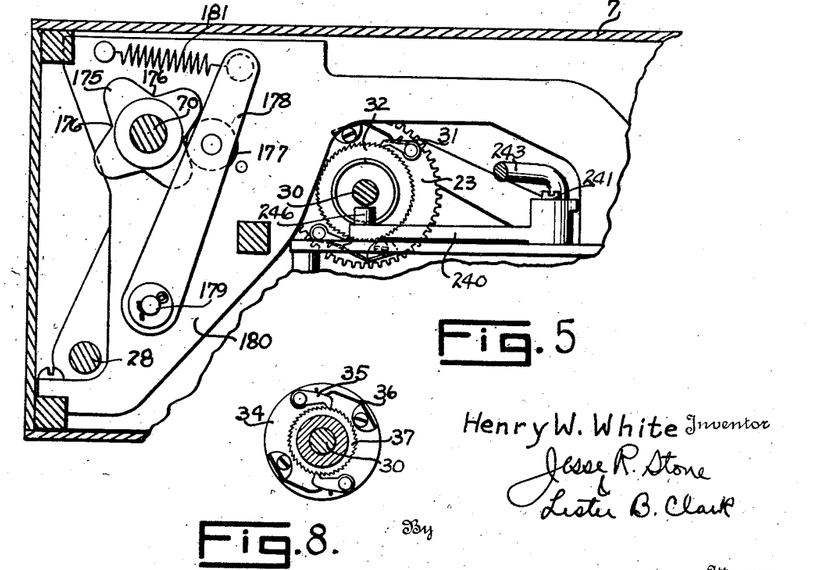
Fig. 5 is a broken longitudinal section taken on the plane 5—5 of Fig. 1.
Fig. 8 is a sectional detail on the plane 8—8 of Fig. 3.
Figure 6:
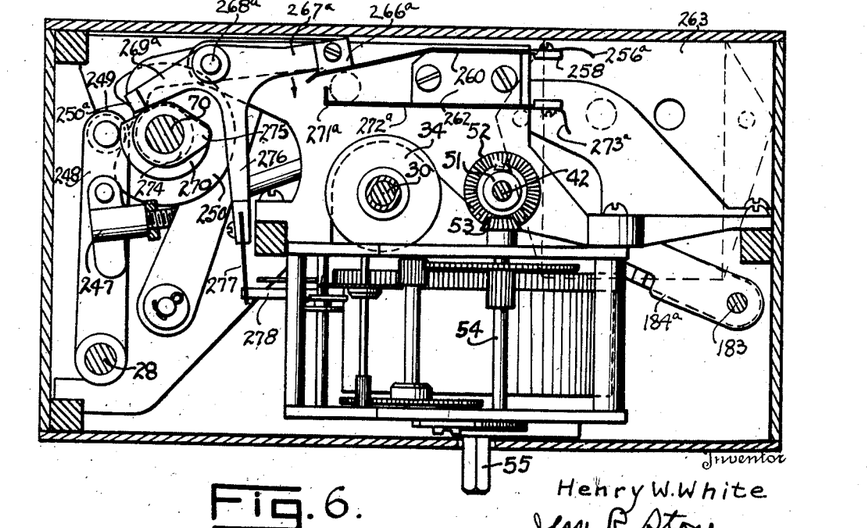
Figs. 6 and 7 are sectional views taken on the planes 6—6 and 7—7, respectively, of Fig. 1, and looking in the direction of the respective arrows.

The gear 23 is mounted upon a shaft 30 transversely of the frame of the device. It is loose upon said shaft but is provided on its inner surface with a series of pawls 31, shown particularly in Fig. 5. These pawls are adapted to engage within the teeth of a ratchet wheel 32, which is fixed upon the shaft. Thus it will be seen that when the gear 23 is rotated in one direction it will communicate rotation to the shaft 30 but when moved in the opposite direction it will have no effect upon the said shaft. Mounted upon the shaft 30 approximately midway between the ends thereof is a sleeve 33. At the end of said sleeve at a point approximately midway of the frame is a disc 34. Said disc is shown in Figs. 6 and 8. On one side of said disc is a series of pawls 35 which are held by springs 36 into contact with a ratchet wheel 37 upon said shaft 30. Thus when the sleeve 33 is rotated in one direction it will rotate the disc 34 and through said ratchet and pawl connection will rotate the shaft 30. The disc and sleeve may, however, rotate in the opposite direction without any effect upon the rotation of the shaft 30.

The other end of the sleeve 33 upon the shaft is formed with a pinion gear 38 thereon. Said pinion gear 38 is adapted to engage with an idle pinion 39, which is mounted upon a pin 40 on the end of a lever 41.

Figure 7:
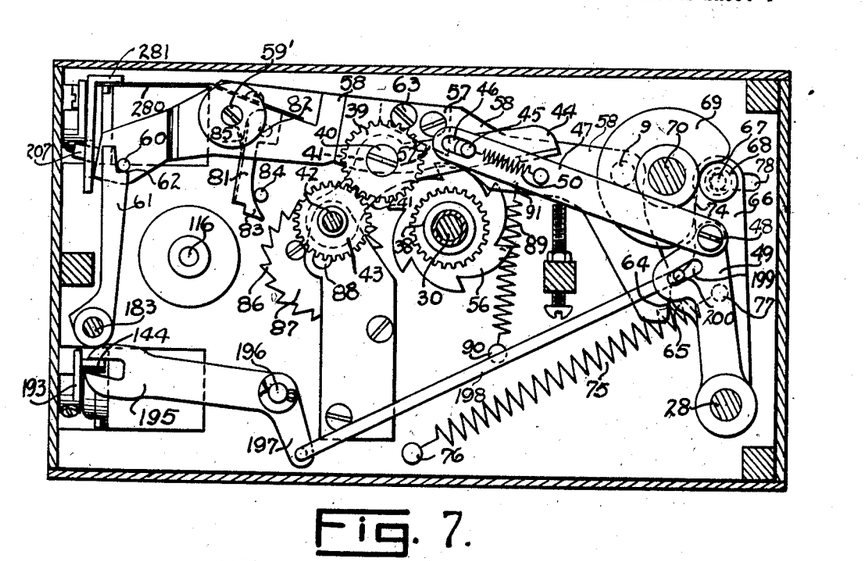

Said lever 41 is pivoted at one end upon the shaft 42 upon which the gear 43 is mounted and it will be seen from Fig. 7 that the gear 39 may, through the swinging of the lever 41, be moved to and from engagement with the gear 38 upon the shaft 30 and thus communicate rotation from the gear 38 to the gear 43 mounted upon the clock shaft 42. The lever 41 is extended upwardly at an inclination and has its upper end 44 formed with a laterally projecting pin 45 thereon. Said pin 45 fits within elongated slot 46 within a swinging arm 47 pivoted at 48 to the upper end of the lever arm 49, said arm being fixed upon the shaft 28. There is a tension spring 50 secured to a pin upon the lever 47 and engaged at its other end with the pin 45 on the lever 41. The said pin 45 is thereby held resiliently in one end of the slot 46 so that when the shaft 28 is moved in the operation of the machine, as will be later noted, the arm 49 will be caused to swing and exert a push upon the pin 45 and thus raise the lever 41 and move the gear 39 out of contact with the gear 38. When, however, the lever arm 49 is moved in the opposite direction the initial motion will have no effect upon the pin 45 until the other end of the slot 46 contacts with the pin 45 to swing the lever arm 41 and move the gear 39 into contact with the gear 38.

The shaft 42 upon which the gear 43 is mounted is the clock operated shaft. Said shaft has thereon a sleeve 51, which is secured to the shaft by a set screw. On one end of said sleeve is a beveled gear 52 which engages a smaller pinion 53 upon the shaft 54 of the clock.

In Fig. 6 a portion of the clock mechanism is shown. It is to be understood that this clock mechanism is not new. It is operated through a spring motor which is wound up through rotative engagement with the stem 55 and through a train of gears shown in Fig. 6 a uniform motion is communicated to the shaft 54 and through said shaft to the shaft 42 previously described. It will thus be noted that the shaft 30 may be operated through the arrangement of gears upon the shaft 42 and the idle gear 39 when the speed of the clock-operated shaft exceeds the speed of the speedometer shaft. The drive from the clock-operated shaft to the shaft 30 and from the disc 34 to the said shaft 30, as illustrated in Fig. 8, will allow the rotation of the shaft by the speedometer connection when the speedometer operates at a speed greater than that of the clock, but when the clock is operated at a speed greater than that of the speedometer as, for example, when the car is slowing down or stopping at an intersection, then the clock will pick up the rotation of the shaft 30 and keep it going at the uniform speed of the clock.

The rotation of the shaft 30 through either the speedometer connection or the clock connection will be indicated by means of the usual meter dial or dials.

The connections through which the rotation of the shaft 30 serves to operate the dials upon the meter will now be described, and as shaft 30 serves to operate the fare-indicating mechanism it will be referred to as the operating shaft.

Mounted upon the shaft 30, forwardly from the clock-operated gear 38, is a six-point cam wheel 56. The rotation of the shaft 30 will carry with it this cam wheel and each time one of the cams reaches a position above the shaft it will engage with the inclined edge of a plate 57 upon the lever arm 58.

The lever 58 extends nearly the entire width of the frame of the device. It is pivoted adjacent one end upon the pin 59 mounted upon the side plate of the frame. One end of said lever is inclined downwardly and has adjacent the end a laterally extending pin 60, which when the pawl 61 is in proper position will engage with a shoulder 62 thereon. The lever is extended on the opposite side of its pivot laterally and downwardly. The plate 57 is secured thereto by means of set screws 63. The lower inclined edge 57' of said plate 57 assumes a position above the cam wheel 56 and when the meter is running, the end of the cam plate 57 will contact with the cams upon the wheel 56.

The lever arm 58 has its end adjacent its pivot 59 curved and directed downwardly at an angle and has an end cam face 64 thereon which engages with a cam 65 upon a lever arm 66, said lever arm being secured in a fixed position upon the shaft 28. It will be understood that when the lever arm 66 has been moved to contact with the cam face 64 of the lever 58, the pin 60 at the other end of said lever will be prevented from moving downwardly.

Lever arm 66 has at its upper end a through pin 67. On one side of the arm a roller 68 is mounted on said pin to cooperate with a cam 69 mounted upon the cam shaft 70.

Said shaft 70 is mounted for rotation in a transverse plate 71 toward the forward side of the meter frame and in another transverse plate 72 adjacent the opposite side of said frame. It has the semaphore flag 73 fixed thereon at the forward side of the meter.

The cam 69 on said cam shaft is circular except for the curved recess 74 thereon at one side. When the flag 73 is erect and the meter not operating this recess receives the roller 68 on lever 66. Said roller is held resiliently in that position by spring 75 secured at one end to the frame at 76 and at its other end to the pin 77 on lever 66.

On the opposite side of the lever 66 the pin 67 projects through an arcuate slot 78 in the plate 71 of the frame. The pin 67 also engages within an opening 79 in a control plate 80 on the opposite side of the frame plate 71 to move the same, which plate will be later described.

Mounted upon the lever 58 toward the free swinging end thereof is a downwardly depending pawl 81. Said pawl has its upper end pivoted to the lever arm at 82. Its lower end is formed with a laterally inclined foot 83 thereon which bears against a stop pin 84 on the frame plate. It is held against said pin by a leaf spring 85 fixed at one end to the pin 59'. The lower end bears against the side of the pawl 81.

The lower end of the pawl 81 is adapted to engage with teeth 86 upon a ratchet wheel 87 rotatable upon a pin 88 mounted in the frame of the meter box. The pawl 81 is shown in Fig. 7 in raised position as would be the case where the meter is not operating. When the flag is moved downwardly to bring the device in operating position the pawl 81 will be reciprocated by the rotation of the six-point cam wheel 56 so as to periodically bring the foot 83 of the pawl into engagement with the ratchet wheel and move said wheel through a partial rotation at each engagement. It will be understood that the arm 58 will be held normally downward by a spring 89 fixed to the frame plate at 90 and engaging with the lever arm at 91. Thus, when the cam wheel 56 is rotated it will raise the arm 58 but as soon as the cam has passed its position adjacent the arm the spring 89 will cause the arm to move downwardly to engage the ratchet wheel 86. This movement of the arm 58 will, however, be prevented as long as the latch 61 engages the pin 60 thereon.

The movement of the ratchet wheel 86 will cause the rotation of the shaft 88. Said shaft extends through the plate 71 of the frame and on the opposite side of said plate it has thereon a plurality of discs which are secured to said shaft in such manner that they will all rotate with the rotation of the shaft. The first of these discs is shown in dotted lines at 92. Said disc has thereon one laterally extending tooth 93, which has a forward face thereon adapted, when the control plate 80 is moved, to engage with a projecting finger 94 thereon and stop the rotation of the said shaft 88.

Closely adjacent the disc 92 is a ratchet disc 95. Said ratchet disc has teeth thereon which are normally adapted to engage with a tooth 96 upon a depending pawl 97. Said pawl 97 is pivoted at 98 at its upper end and has a horizontally extending arm 99 to which is engaged a tension spring 100 secured at one end to the pin 101 in the frame and tending to hold the pawl 97 inwardly into contact with the ratchet teeth 95a of the disc.

Forwardly from the disc 95 is a gear wheel 102. Said gear wheel is spaced from the ratchet disc 95 by a space plate 103 shown in Fig. 9. The gear wheel 102 which is immediately in front of the spacer 103 is shown in Fig. 10. It is positioned to engage with an adjacent spring-operated gear 104. The gear 104 is mounted upon a stub shaft 105 in the frame, said shaft 105 extending through the frame plate 71 and having on the rearward side of said plate a tension spring 106, which may be seen on the right-hand side of Fig. 1. This spring surrounds a hub 107 on the shaft 105 and is held between the plate 71 and a flange 108 on the hub. It will be understood that one end of this spring is secured to the stationary plate 71, and the other to the hub upon the shaft. In this manner when the shaft 88 is moved during the operation of the meter the gear wheel 104 will also be rotated to wind up the spring 106 upon the shaft. It will, therefore, exert a tension on the shaft 105 tending to rotate the gear 104 in the direction of the arrow. When the gear 104 has been rotated through the running of the meter for a sufficient time to wind up the spring an open place upon the gear, shown at 109, will come into engagement with the teeth of the gear 102 and no further rotation of the gear 104 will take place.

The spring will, however, hold the teeth of said gear 104 against the teeth of the gear 102 so that the gear 104 will constantly tend to resist the rotation of the gear in the direction of its normal rotation, which is a clockwise rotation, as shown in Fig. 10. When the gear 102 is released by the disengagement of the pawl 96 therewith the gear 104 will immediately spin the shaft 88 back to zero position with the tooth 93 on the disc 92 in engagement with the tooth 94 on the control frame 80, as will be later noted.

On the forward end of the shaft 88 is a dial plate 110. Said dial plate is rotatable with the shaft in the direction shown by the arrow and serves to bring into registration with an opening 111, in a shield plate 112, the proper figure indicating the fare due from the passenger in the car. On the rearward side of the dial plate 110 is a pawl 113, shown in Fig. 10. This pawl is pivoted upon a pin 114 in the rearward side of the dial plate. The view in Fig. 10 shows the dial plate removed, the pin 114 having been cut immediately adjacent the plate and Fig. 10 indicates the position which the pawl would assume in the operation of the device. As the pin 114 is mounted on the dial plate which rotates with the shaft 88, the pawl 113 is carried around by the rotation of the shaft and dial plate to engage with a ratchet wheel 115 upon an adjacent shaft 116. The pawl 113 has a forward projection 117 which is held normally extending in approximately radial position away from the shaft 88 by means of a flat spring 118 fixed at 119 upon the rotating dial plate. It will be seen that when the pawl 113 has been carried around by the continued rotation of the shaft 88 to the proper position said pawl will engage with the teeth on the adjacent ratchet wheel 115.

It will be understood, therefore, that the assembly of discs on the adjacent shaft 116 will be given a short partial rotation each time the pawl 117 is brought around into position to engage the teeth on the ratchet wheel 115. The number of teeth upon the wheel 115 will be so calibrated, as to cause the rotation of the assembly of discs on the shaft 116 one notch to each complete rotation of the disc 110 having the digits below 100 thereon. Thus when the dial plate 110 is rotated to indicate 100 cents then $1.00 will be brought into view on the adjacent dial plate.

Figure 14:
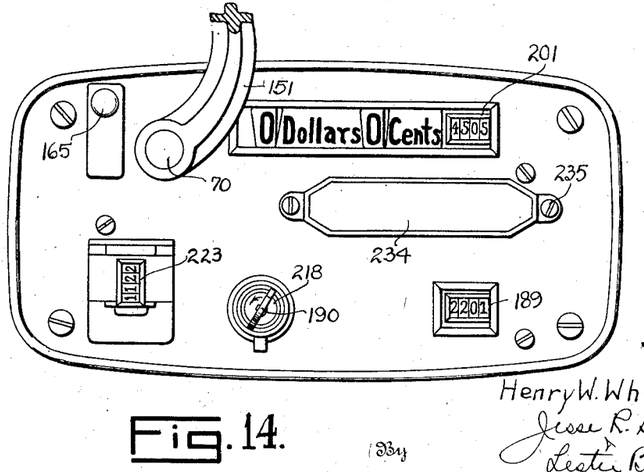
Fig. 14 is a front elevation of the housing for the device showing the covers for the indicating dial indicators removed.

The shaft 116 is mounted upon the forward side of the frame plate 71 and the ratchet wheel 115 is formed upon a hub 120 on said shaft said hub being connected to rotate with the assembly of toothed discs as seen in Fig. 14. Said hub is freely rotatable on the shaft. The ratchet wheel 115 is closely adjacent the control plate 80 and its teeth are adapted to be engaged by said pawl 113 as previously noted, thus communicating intermittent rotation to said wheel and hub in a counter-clockwise direction.

Figure 9:
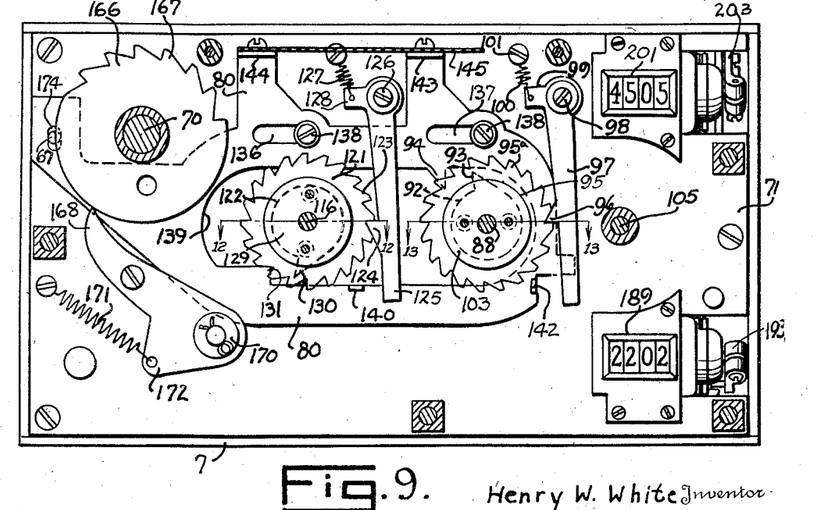
Figs. 9, 10 and 11 are longitudinal sections taken on the planes 9—9, 10—10 and 11—11, respectively, of Fig. 1.
Figure 10:
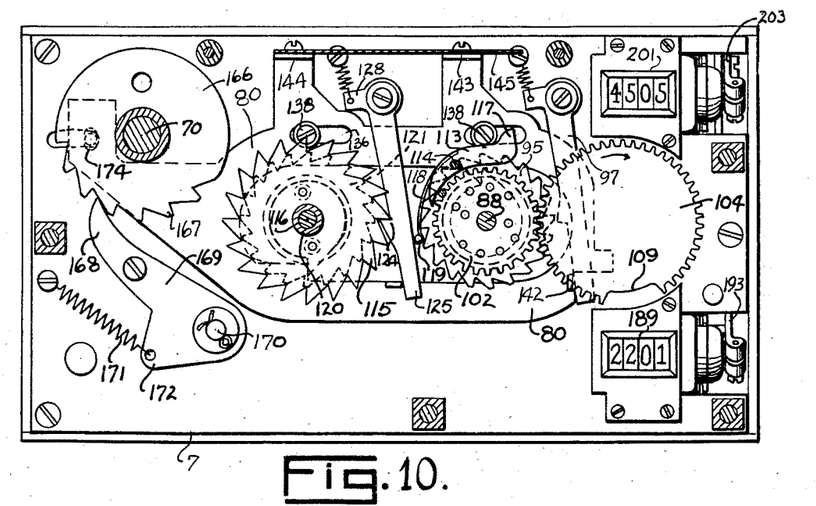

Directly behind the ratchet wheel 115 and spaced slightly therefrom is a ratchet wheel shown at 121 in Fig. 9. Said ratchet wheel is secured through a space plate 122 with the said ratchet wheel 115. The ratchet wheel 121 is shown best in Fig. 9. It has teeth 123 thereon which may be engaged by a tooth 124 upon the pawl 125. Said pawl 125 is pivotally mounted upon a pin 126 at its upper end and is held resiliently toward the ratchet wheel 121 by a tension spring 127, which is secured to a short arm 128 on said pawl. Thus the ratchet wheel 121 is prevented from clockwise rotation during its operation.

On the inner side of the ratchet wheel is a small disc 129. Said disc has a single radially extending tooth 130 thereon which is intended at the proper time to engage the shoulder 131 upon the control frame 80 (Figs. 9 and 10) to limit the rotation of the ratchet wheels 121 and 115.

Figures 1, 12, 13:
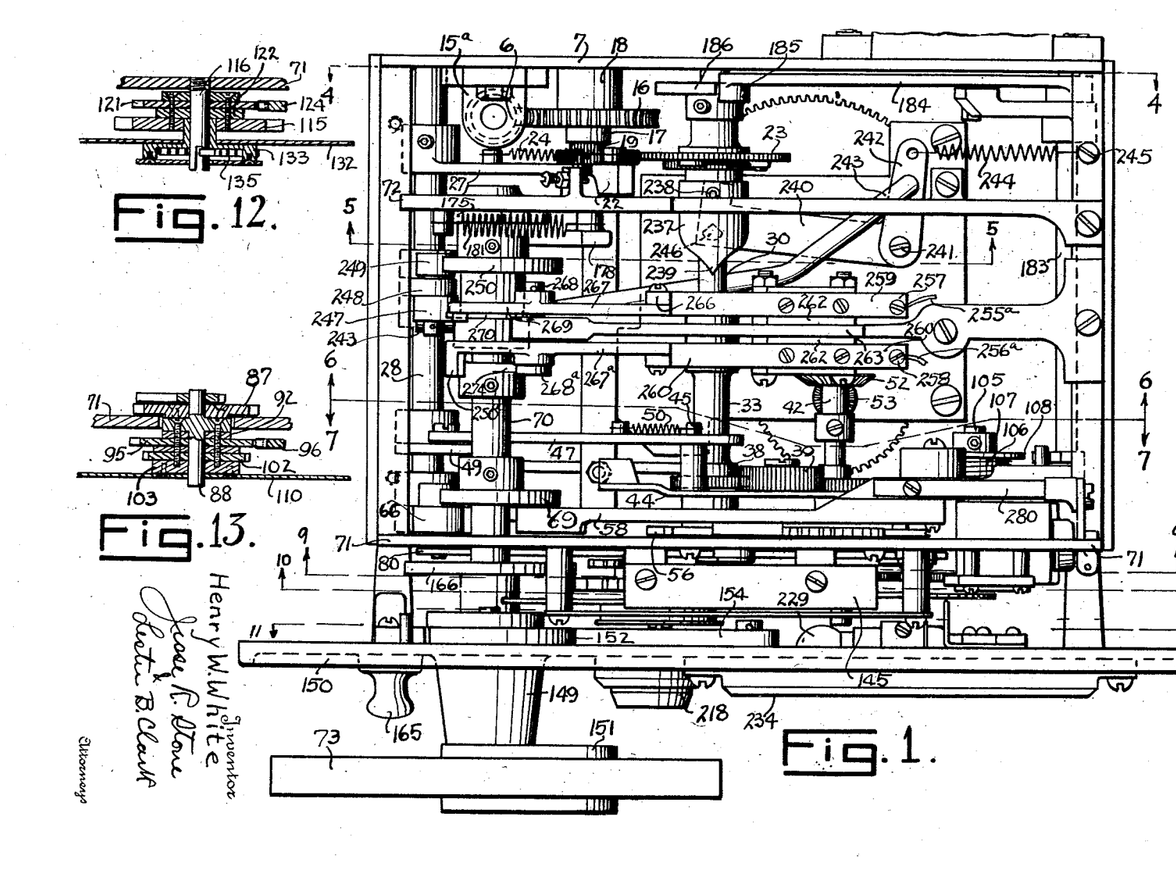
Fig. 1 is a top plan view of the mechanism employed with my device, said apparatus being removed from the housing.
Figs. 12 and 13 are sectional views taken on the planes 12—12 and 13—13, respectively, of Fig 9.
Figure 2:
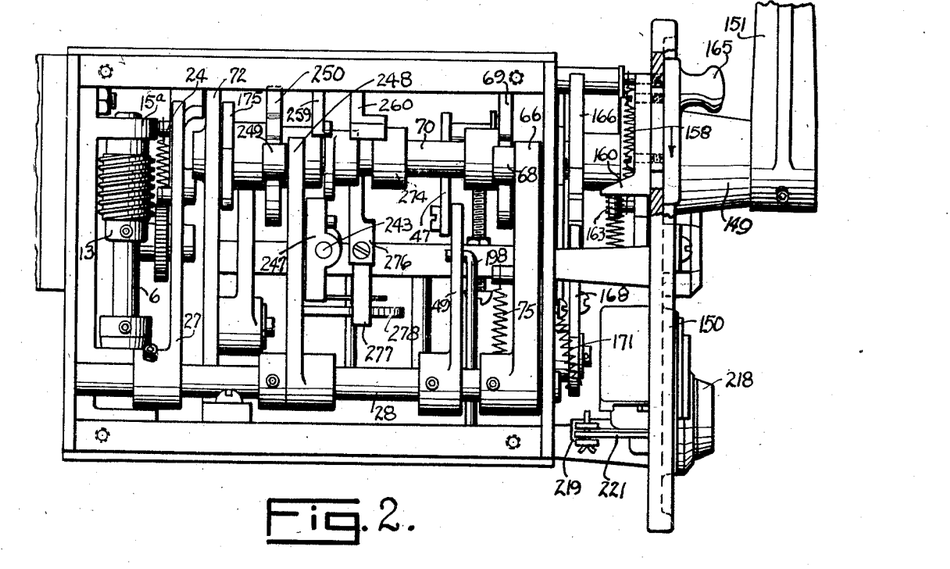
Fig. 2 is an end elevation of the device taken from one end thereof.

On the forward end of the shaft 116 and secured to the hub 120 is a dial plate 132 shown best in Fig. 12. This dial plate is rotatable through the operation of the ratchet wheel just described. Centrally of the dial plate 132 is a hub 133, which has a central recess to house a tension spring 134. Said spring is secured at one end to the hub 133 and at the other end to the shaft 115. It will be seen that the spring will be placed under tension as the plate 132 is rotated on the shaft and that when the dial plate is released the spring 134 will spin the disc back to zero on the scale, the rotation being stopped by the engagement of the tooth 130 on the inner disc with the shoulder 131, as will be presently described.

It will be clear that the meter should be held in locked position with the dials indicating zero on the visible portion of the scale. This is done in my construction by the use of a control plate 80 which has been previously referred to. This plate 80 is mounted to slide on the forward side of the frame plate 71. There are horizontal slots 136 and 137 therein through which the pins 138 extend. The plate is, therefore, allowed a limited sliding movement in a horizontal plane. The plate has a central opening 139 through which the shafts 88 and 116 extend. The downwardly extending tooth 94 projects into the opening and is adapted to engage the tooth 93 upon the disc 92 on said shaft 88. The shoulder 131 is formed toward one end on the lower side of said opening, said shoulder being engaged at the proper time by the tooth 130 on the inner disc 129.

There is a forwardly extending lug 140 at the lower edge of the opening 139, which while the device is in inoperative position, as shown in Fig. 10, will engage the lower end of the pawl 125 and hold it out of engagement with the ratchet wheel 121. There is another forwardly extending lug 142 at the righthand end of the control plate 80 which will likewise engage with the pawl 91 and hold the tooth 96 out of engagement with the ratchet teeth 95a. When the pawls are thus brought out of engagement with the adjacent ratchet wheels the spring tension on the said wheels will rotate both shafts 88 and 116 to bring the zero portions on the dial into view, the ratchet wheels being then stopped with the tooth 93 on one disc engaging the tooth 94 on the control plate and the other tooth 130 engaging the shoulder 131 on the control plate.

The control plate has at its upper end two laterally extending arms 143 and 144. These arms serve as an attachment for a plate 145. Said plate is turned downwardly and has a shield thereon which is shown best at 146 in Fig. 11. Said shield tends to obscure openings 147 and 148 in the shield plate 112 so that the figures upon the two dial plates can not be read. Upon the plate 146 I mark two zeros, which, when the control plate is in inoperative position and meter not running, will indicate zero in both the openings. It will be understood that when the shield plate is moved to operative position as shown in Fig. 9, the plate 146 will be moved to the left of the position shown in Fig. 11, and allow the operator to view the numbers upon the dial plate. It will be understood that the dial plate 110 will normally start with the numeral 25 showing therethrough so that when the flag is rotated to bring the device into operative position the zeros on the plate 146 will disappear and a zero on the dial plate 132 will appear in the opening 147, but in the opening 148 the numeral 25 will appear. Obviously it can be arranged so that any other numeral, such as 10 or 15, could be initially presented through the opening to indicate that the fare for the trip will be at least the amount appearing in the opening when the meter is thrown into operative position.

The control plate is moved to operative or inoperative position by the rotation of the flag shaft 70. This shaft is mounted above and slightly inward from the shaft 28 previously referred to. The inner end is mounted in the plate 72. The forward end is mounted in the plate 71 and projects through a hub 149 formed on the forward side of the face plate 150 of the meter box. On the portion of the shaft projecting through the hub 149 is a crank arm 151 upon which is mounted the semaphore or flag 73 previously noted.

Mounted upon the cam shaft against the inner face of the plate 150 is a cam wheel 152. Said cam wheel is rotatable with the shaft in a counter-clockwise direction as seen in Fig. 12. Said cam is prevented from rotation when the flag is moved to erect position by means of a shoulder 153 formed to engage with the forward end of a lever arm 154 pivoted at one end upon a pin 155. The end of the lever beyond the shoulder 153 has a projecting finger 156 which serves as an attachment for a pin 157 to which the tension spring 158 is engaged, said spring being secured at its upper end to a pin 159 on the plate.

Adjacent the forward end of the lever arm 154 and adapted to contact with the finger 156 is a sliding block 160. Said block is slidable with a guide plate 161 and is held resiliently upward by a spring 162 fitting about a projection 163 upon the block 160. Said spring 162 rests at its lower end upon a stationary support 164. The block 160 has a projection through the face plate 150 with a knob 165 which may be depressed to move the block 160 downwardly and push the locking lever 154 downward to disengage the shoulder 153 on the disc 152. This will release the semaphore arm so that it may be moved by the operator. It will be understood that the arm must be unlatched in this manner each time it is to be manually rotated.

At the upper end of latch guide plate 161 is a finger 187 projecting laterally therefrom toward the cam 152. When the circular surface of the cam is adjacent the finger 187 the latch plate 161 cannot be depressed to move the latch arm 154. When the recessed area 152a on the cam comes into position adjacent the latch member 154 the said member will move upwardly and will finally be engaged by the shoulder 153 on the cam 152. While the cam is rotating and the larger diameter area is adjacent the finger 187 the latch plate 161 cannot be depressed but when the shoulder 153 has engaged the latch lever 154, a flattened portion 152b will be adjacent the finger 187 and the latch plate 161 may be then depressed to unlatch the lever 154 from shoulder 153 and permit the flag to be again rotated. This assures that the flag arm cannot be started to register another fare before the mechanism described in the operation of the meter has all been properly reset by the rotation of the cam shaft back to its initial position as described.

Mounted on the shaft 70 inwardly from the cam 152 is a disc 166, which is fixed on the shaft and rotatable therewith. Said disc is circular except on one side where it has a plurality of ratchet teeth 167. Said teeth when presented downwardly will engage with the forward end 168 of a pawl 169. Said pawl is pivoted upon a pin 170 and a spring 171 engaging with a lateral projection 172 tends to hold the pawl upwardly into engagement with the ratchet teeth 167. Thus the rotation of the shaft 70 in what may be called the reverse direction is prevented by the engagement of the pawl 168 with the teeth on said disc.

On the inner side of the frame plate 71 is a cam 69 fixed on the shaft 70 in the manner previously described and shown in Fig. 7. The function of this cam is to engage with the roller 68 on the lever 66 to move it to the right of its position shown in Fig. 7, and by the movement of said lever to prevent interference with the operation of the lever 58, which serves to actuate the fare indicating mechanism. Furthermore, the pin 67 on the end of the lever 66, which projects through the opening 78 engages within a slotted opening indicated in dotted lines at 174 in Fig. 10. Thus the movement of the pin 67 will tend, because of its engagement in the opening 174 in the control plate 80 to move said control plate from its position shown in Fig. 10 to its position shown in Fig. 9. The pin 67 has a sliding vertical play in the opening 174 so that the swinging movement of the pin may be accommodated.

The flag shaft may be stopped temporarily in position either erect or at 90° intervals thereafter. The holding of the shaft releasably in any one of these four positions is accomplished by a cam 175 on said shaft 70. As seen in Fig. 5, this cam has four notches 176 therein into which may engage a roller 177 upon a lever 178. Said lever is pivoted at its lower end upon a pin 179 mounted in a frame plate 72 and is held resiliently in position in one or the other of the notches 176 by a spring 181.

The spring 181 has considerable tension and when the roller 177 falls into one of the notches 176 an extra turning effort has to be exerted on the shaft 70 to cause one of the arms 175 to push the roller 177 and lever 178 laterally to bring the roller into the next succeeding notch.

When the meter is started with the dial indicating a minimum amount, such as 15¢ or 25¢, or any similar amount, it must be arranged so that the vehicle may run for a period without affecting the counting upon the dial. I have therefore arranged so that the lever 57, which actuates the counting mechanism, will be held against operation for a limited period after the meter has started and thus prevent the indicating of an additional amount upon the dial of the meter until the passenger has obtained a ride of the proper distance to account for the initial amount of 25¢. This is done by virtue of the pawl 61 shown in Fig. 7 and previously described. Said pawl engages the pin 60 upon the operating lever 58 and prevents the downward movement of the lever. The pawl 61 is mounted in a position fixed upon a shaft 183 which extends across one end of the frame of the meter. This shaft has adjacent the other end thereof a lever 184, which is extended upwardly at an angle and has a pin 185 at its upper end adapted to engage with a cam disc 186. Said cam disc is mounted upon the shaft 30 and as will be seen from Fig. 1 is closely adjacent the rearward wall of the meter box. The cam 186 has a lateral cam extension 186a thereon.

When shaft 30 is rotated in the operation of the meter for nearly one complete turn the pin 185 will ride up onto the cam and lift the lever 184. When the lever 184 is thus rotated in the operation of the shaft 30 the shaft 183, upon which lever 184 is mounted, will be rotated in a direction to throw the pawl 61 away from the pin 60 and allow the lever arm 58 to drop. This movement will not take place until the cam portion 186a has been rotated in a clockwise direction through approximately 180°. During this 180° movement sufficient distance will be traveled by the vehicle to use up the fare indicated by the original number on the dial. Thereafter the pawl 61 will not interfere with the movement of the lever 58 which will be reciprocated in the operation of the dial plate.

I provide upon the shaft 30 a device for moving said shaft 30 back to its initial position with the cam 186 thereon such that the rotation of said shaft will not affect the dial until the initial 25¢ fare shall have been used up. This device operates at the end of each trip when the flag arm is operated. It will be desirable to start the operation of the shaft 30 with the cam arm 186a thereon directly adjacent the pin 185 on the lever 184, as shown in Fig. 4. To do this I mount upon the shaft 30 a cam sleeve 237 (see Fig. 1). This sleeve is fixed adjustably to the shaft by set screws 238 and has one end of the sleeve formed with an inclined face terminating in a point shown at 239, on one side. On the opposite side of this sleeve away from said point 239 the curved edge terminates in a notch.

Adapted to cooperate with the cam edge of this sleeve I provide a bell crank lever 240. Said lever is pivoted at 241 and has its other arm 242 formed with an opening therein to receive the curved end of a link 243. At the end of the arm 242 a tension spring 244 is connected, the other end of said spring being secured to the frame at 245. This spring tends to hold the lever 240 with its end adjacent the cam 237 into contact with said cam. I form on said lever 240 a wedge shaped lug 246, shown in dotted lines in Fig. 1, which engages normally within the notch on the cam edge of the sleeve 237.

The lever 240 is moved to swing the lug 246 toward or away from the cam edge of sleeve 237 by the rod or link 243. Said link is bent forwardly from its engagement with the lever 242 and extended laterally to connect with a lug 247 upon a lever arm 248 fixed at its lower end upon shaft 28. The upper end of lever 248 has a laterally extending roller 249 which contacts with a cam 250 mounted on the shaft 70. Said cam is circular for the larger part of its diameter and is cut away on the remaining portion to form a recess 250a so that when the larger diameter contacts with the roller 249 the lever will be moved to exert a pull upon the link 243 and move the lever 240 and swing the lug 246 outwardly away from the cam sleeve 237. The shaft 28 is moved by means of the cam 69 on the flag shaft engaging lever 66 on said shaft 28. Thus the movement of the flag shaft 70 to running position of the meter will move cam 250 to swing lever 248 and through the connections just described will move the cam engaging lug 246 from contact with the sleeve 237 and allow free rotation of the shaft 30. It may be noted from Fig. 1 that both cam sleeve 237 and cam 186 are fixed on shaft 30 by set screws. It is also contemplated that the star cam 56 which operates the indicating mechanism and also mounted on shaft 30 will also be adjustable as to circumferential position so that by fixing these three cams in proper positions relative to each other on shaft 30, the distance the passenger can ride for the initial fare will be governed.

When the flag is swung around again into idle position at the end of the trip the lever 66 will move the shaft 28 and cam 250 mounted on shaft 70 will allow the lug 246 to be brought against the cam edge of sleeve 237 and swing the shaft 30 back to the original starting position. When cam 56 in Fig. 7, is set in correct position with the plate 57 on lever 58 engaging therewith, the cam 186 will be set in Fig. 4 position. After shaft 30 has revolved far enough to give the correct amount of travel for the initial fare then cam 186 will have been rotated by shaft 30 to pull pawl 61 from under pin 60 and drop the plate 57 on the top point of the correct cam 56. One of the cams on wheel 56 mounted on shaft 30 will pass from under plate 57 and drop lever 58 each one-half mile of travel, so if the fare is one mile for 25¢, lever 61 stays under pin 60 until one cam 56 passes under plate 57. This will assure a period, when the meter is again started, during which the meter will not operate until the cam 186 has rotated with the shaft 30 to bring the cam arm 186a under the arm 184 and raise it to release pawl 61 from beneath the pin 60 on lever 58 and thus start the indication of the fare thereafter.

An indicator is provided to indicate the number of trips taken by the vehicle upon which the meter is mounted. This trip indicator will be housed behind the face plates 150 and toward the lower portion thereof, as indicated at 189, in Figs. 9 and 14. This trip indicator is normally housed out of sight and not capable of being tampered with by the driver. In Figs. 9 and 14 the number upon the indicator is disclosed. This is accomplished by the movement of an obscuring plate so that the indicating number 189 is visable. This movement is performed through the rotation of a key 190, as will be later described.

Figure 3:
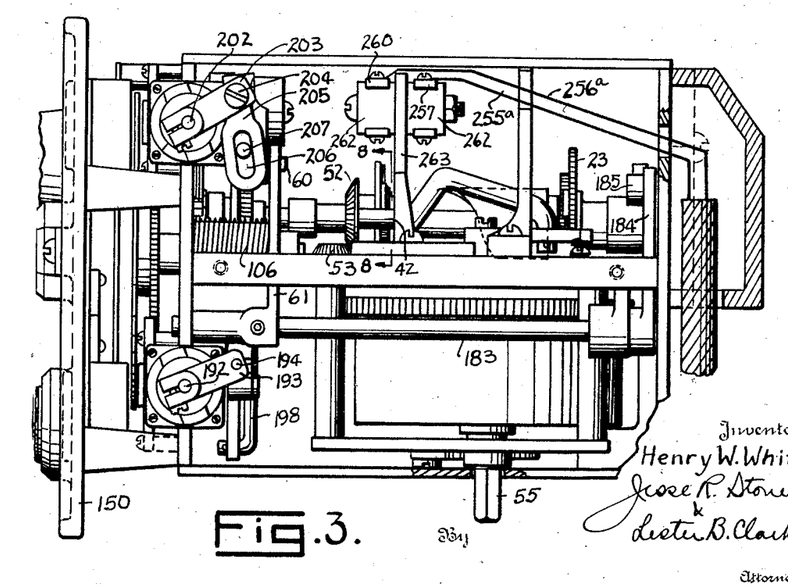
Fig. 3 is an elevation taken from the opposite end of said apparatus.

The indicator 189 is shown in Figs. 3, 4 and 7. There is a shaft 192 in the indicator which operates an indicating mechanism of standard construction, the details of which are not material. The shaft 192 which operates the indicating mechanism has an arm 193 thereon, said arm having a crank pin 194 at its upper end. This pin 194 is engaged within the forked end of a lever 195 of bell crank formation. Said lever is pivoted at 196 and the downwardly extending arm 197 thereon is connected by a link 198 to the lever 49 previously described. Said lever 49 has a slot 199 therein within which the curved end 200 is engaged. It will be seen that the lever arm 49 which also operates the movement of the clock connecting gears may be moved a certain amount before the end 200 of the link engages within the end of the slot 199 and causes movement of the link and the indicator actuating mechanism. Thus each time the arm 49 is moved through the rotation of the cam shaft 28 in the setting of the indicating mechanism one movement will be communicated to the indicator shaft 192 to indicate one trip upon the trip indicator when flag 73 is turned one round.

The total amount of fares taken in by the operator of the car during the day is obtained by adding the amount shown by a small indicator at the right of the single fare indicator to an amount obtained by the number of trips multiplied by the initial fare. Thus, in Fig. 14, the total fare indicator is shown at 201. This indicator is similar in general construction to the trip indicator. It is housed to the rear of the face plate 71 and is shown at the upper portion of Fig. 3.

The shaft 202 of the indicator has thereon a crank arm 203, which has a pin 204 at its outer end, said pin being secured at the upper end of a pull rod 205. Said pull rod has a longitudinal slot 206 in the end thereof which receives a pin 207 at the extreme end of the operating lever 58 previously described. It will be seen that each time this lever is reciprocated through the operation of the six-point cam member 56, the pull rod 205 will be raised by a spring arm 280 on lever 58 to indicate an additional amount upon the fare indicated. Thus if a charge of 5¢ upon the dial is indicated each time the lever 58 is reciprocated this same amount will appear on the indicator 201. As the fare was 25¢ before the operation began the operator will add 25¢ for each trip shown to get the total.

Figure 11:
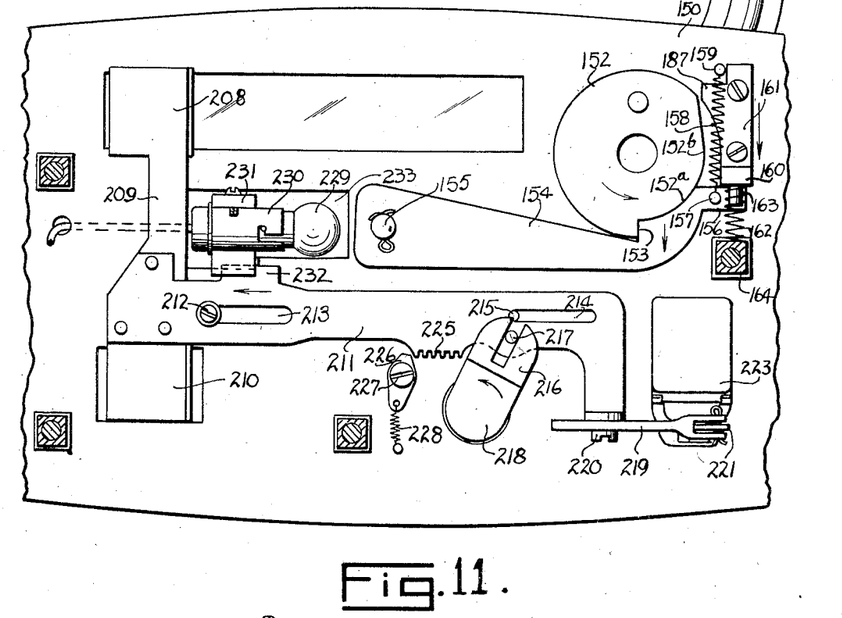

This amount will ordinarily be obscured from the forward side by the upper arm 208, upon a plate 209, shown in Fig. 11. This is the plate which also obscures, through the arm 210, the opening through which the number of trips is shown. The plate 209 is formed at one end of a locking plate 211. Said plate 211 is secured slidably to the rearward side of the face plate by a pin 212 engaging through a slot opening 213 in said plate. A second slotted opening 214 is formed in said plate to receive a pin 215. The locking plate 211 may be moved through an arm 216 forked at its end to slidably receive a pin 217 on said locking plate. The arm 216 is formed upon a short stub shaft 218. Said shaft has a key-receiving slot in its end projecting through the face plate. This slot receives the key 190 previously referred to and, by means of the key, said shaft 218 and the arm 216 may be rotated in a counter-clockwise direction, as shown in Fig. 11, to move the arms 208 and 210 thereon to disclose the numeral on the indicators behind the same. The movement of this locking plate will carry with it an arm 219 secured to the lower side of said plate by a pin 220. When this arm is moved it will tend to move a crank arm 221 upon an indicator 223. Said indicator will thus indicate each time the locking plate is moved and will indicate whether anyone has obtained a key whereby the locking plate may be moved. The indicator 223 is also shown in Fig. 14. To assure, each time the key is employed to move the locking plate 211, that the said locking plate be moved through its full movement so as to actuate the indicator 223, I provide a ratchet 225 on the lower edge of the plate 211 and have provided a pawl 226 to cooperate therewith. Said pawl is pivoted upon a pin 227 and is held resiliently with its upper end extending toward the plate 211 by a spring 228. This pawl will engage with the ratchet teeth 225 and prevent the release of said plate until it has been moved far enough to the left in its initial movement to disengage all of the teeth 225 with the end of the pawl 226.

I illuminate the recording dial plate by means of an electric bulb 229 set in a slot below the openings in the face plate through which the dial plate appears. This bulb is mounted within a socket 230 fixed upon a plate 231 which will be normally locked against movement in either direction by a short arm 232 on the locking plate. The plate 231 upon which the bulb is mounted can hence not be moved from its position without unlocking the machine by moving the locking plate 211 to the left of the position shown in Fig. 11. This locking plate has connection through an opening 233 in the face plate with a cover member 234, as seen in Fig. 14. This cover plate is also secured in position by screws 235. When the screws are released, however, the cover plate 234 can not be removed to obtain access to the light without unlocking the machine through the movement of the plate 211. Thus the driver can not remove the light so that the fare will not be visible unless he has a key enabling him to rotate the shaft 218 and move the locking plate 211.

In order that an observer may tell when the car is occupied and the meter working properly, I arrange a display box upon the top of the car (not shown) and separate lights therein are controlled through conductors 255a and 256a connected to posts 257 and 258 upon switch arms 259 and 260, respectively, in the meter box as seen in Fig. 1.

The switch 259 controlling one of the display lights may be best seen in Fig. 1. The arm 259 is mounted upon a block 262 of insulating material secured upon one side of a frame plate 263. This will be seen in Fig. 3. The switch 259 is similar in construction to the adjacent switch 260, which is seen in Fig. 6, and comprises the upper conducting member 259, which is curved downwardly from its connection with the block 262 and is engaged on its upper side by a block of insulating material 266 on one side of a bell crank lever 267 pivoted to a pin 268, projecting laterally from the frame member 263 previously noted. The bell crank lever 267 has a laterally extending arm 269, which is curved downwardly to contact with the cam 270.

The cam 270 is mounted upon the shaft 70 and is formed to hold the lever arm 267 in the open position of the switch but when the shaft 70 is rotated by means of the flag arm to set the meter running, the cam will raise the arm 269, thereby depressing the arm 267 and bringing the rearward end of the conducting arm 259 into contact with the terminal 271 of the other arm of the switch, thus closing the switch at that point to turn on a display light and thus indicate that the flag has been turned a sufficient distance to start the running of the meter.

The wire 256a is connected within the meter box to one end of the arm 260, previously noted. This arm is also connected upon a block of insulating material 262 secured to the side of the frame member 263. The construction of this switch is the same as the construction of the switch including the arm 259 and is represented in Fig. 6 by the same numbers but having the prime letter a thereon. In this switch, however, the arm 269a of the switch contacts with a different cam member 274 mounted upon the shaft 70 and having a single raised portion 275 thereon. Thus the rotation of the shaft 70 will bring the raised portion 275 against the arm 269a of the bell crank lever to close the contacts between the arms 260 and 272a only when the shaft 70 has been rotated through 180° with the flag extending downwardly, which is the full running position thereof. The circuit will thus be closed through the switch including the arm 260 to actuate another display light and thus show that the meter is in full running position, and the recording mechanism properly working, with the brake arm or flexible finger 277 released from contact with the wheel 278 of the clock.

The contact of the finger 277 with the wheel 278 acts as a brake to stop the running of the clock and by this means the clock is prevented from operating except when the flag arm has been rotated to bring the indicating mechanism of the clock into full working position. The clock will not operate when the flag arm is turned to only 90° but will be released before operation when the flag arm has been moved 180° and points directly downwardly.

The operation of the device will be understood from the description already given. When the meter is in locked position with the flag erect there will be no running of the mechanism and the parts will all be in neutral position. When a passenger enters the car the driver will depress the knob 165 to release the latching lever 154 and the flag will then be rotated in a clockwise direction as viewed in Fig. 14, for example. This rotation of the flag arm will rotate the shaft 70 and as the shaft 70 is rotated the different parts of the mechanism will be thrown into operative position in the desired sequence.

The movement of cam shaft 70 will swing the arm 248 through the contact of the cam 250 on said shaft with the roller 249 on said arm. When the arm is moved laterally by contact with the cam the shaft 28 will be partially rotated to swing the arm 27 thereon and thus allow the spring 24 to swing the arm 22 and bring the gear 20 into engagement with the gear 23 and thus start the rotation of the indicating mechanism. Thus the shaft 30 will be brought into operation through the drive shaft 6 on the first movement of the flag arm.

The movement of the shaft 28 in the manner described will also swing the arm 49 and through the link 47 will move the lever 44 and bring the clock into running engagement with the shaft 30. This movement is delayed, as previously noted, by the loose engagement of the pin 45 in the slot 46 of the lever 47. The clock will, therefore, be brought into operative connection with the shaft 30 only after the flag has been swung to a slightly greater distance than is necessary to run the meter through the drive shaft 6.

This operation of the shaft 30 will rotate the six-point cam member 56 to operate the indicating mechanism through engagement of said cam with plate 57 on lever 58. Each of the six cam members upon the cam 56 will cause the arm 58 to be moved up and then dropped as the cam passes the lever, or more accurately, the plate 57 upon the lever, and the pawl 81 will thus be reciprocated to rotate the ratchet wheel 87. It will be noted that the end of the lever 58 bearing the pawl 81 and pin 60 is provided with an outwardly extending leaf spring 280 which is adapted to engage a stop member 281 mounted upon the interior of the meter frame. This leaf spring limits the outward travel of the lever 58 and also resiliently holds the pin 60 in engagement with the shoulder 62 of the pawl 61 when such pawl is in position to restrain the lever 58 from movement toward cam member 56 to effect actuation in the manner above described.

As previously noted, when the indicating dial is set to an initial fare, such as 25¢, the pawl 81 will not be moved to operate the ratchet wheel 87 for a short period due to the engagement of the pawl 61 beneath the pin 60 on the lever 58. This pawl 61 will, however, be moved out of engagement with the pin 60 as soon as the shaft 30 has been rotated sufficiently to bring the bevel cam surface 185a beneath the end of the lever 184 and thus rotate the shaft 183 and move the pawl 61 from beneath said pin 60. When the pawl has been thus swung out of engagement the arm 56 will drop and will be thereafter engaged by the cam wheel 56 and reciprocated.

The reciprocation of the lever 58 and the rotation thereby of the ratchet wheel 87 will cause the rotation of the shaft 88 upon which the ratchet wheel 87 is fixed. The rotation of this shaft will take with it the ratchet wheel 95 and the dial plate carried thereby. The pawl 113 on the rearward side of the dial plate 110 will in its rotation engage a tooth 115 on the adjacent shaft 116 and cause a rotation of the said shaft sufficiently to bring another number on the dial plate carried thereby within the opening 147 and show that another dollar has been charged on the dial against the occupant of the car.

There are a number of safety provisions in connection with the meter mechanism which might be again noted. With reference to Figs. 9 and 10, for example, the disc 166 upon the flag shaft 70 may not be rotated in a righthand direction to start the running of the meter and then be rotated back to its original position without completing the entire circle. This is because of the engagement with the ratchet teeth 167 on said disc by the pawl 168. The driver of the car can not thus prevent the indicating of a full trip after the flag arm has been moved to initiate the running of the meter mechanism. Further, it is impossible for the operator to obtain access to the light 229 which illuminates the dial without the use of a key to rotate the shaft 218, as seen in Fig. 12. Further, it is necessary to have a key to unlock the mechanism to obtain a view of either of the indicators 201 or 189. These two indicators will be obscured by the plates 208 and 210 and only can be viewed by the use of the key. The driver of the car can not tamper with the device due to the fact that it is completely enclosed and housed within the glove compartment of the car.

It will be noted that I have provided a simple type of meter compactly arranged to be housed within the glove compartment of the car and so sealed about that no tampering with the mechanism of the meter will be possible without the same being disclosed by means during the operation of the car and upon the different indicators connected with the meter which are operated in order to obtain access to the interior of the housing.

The advantages of this construction will be obvious to those skilled in the art.

I claim:

1. In a taximeter, a cam shaft including cam means thereon, an operating shaft, means for driving said shaft, a releasable connection between said means and said shaft, a semaphore flag on said cam shaft, a cam sleeve on said operating shaft, a lever pivoted to move toward and away from said cam sleeve, a lug on said lever adapted to engage and rotate said cam sleeve and operating shaft through a partial rotation to a predetermined position, and means responsive to the rotation of said cam shaft and cam means through the movement of said flag to disconnect said driving connection and to operate the said lever.

2. In a taximeter flag locking mechanism, a semaphore flag mounted to rotate about an axis, a cam movable with said flag, a stop shoulder on said cam, a latch arm to engage said shoulder and stop the rotation of the flag when said semaphore flag is in erect non-operating position, means to depress said latch arm and release the flag and cam for rotational movement, and means on said depressing means to engage said cam and prevent releasing movement of said depressing means until said shoulder has engaged said latch arm.

3. In a taximeter flag locking mechanism, a semaphore flag mounted to rotate about an axis, a cam movable with said flag, a stop shoulder on said cam, a latch arm to engage said shoulder and stop the rotation of the flag when said semaphore flag is in erect non-operating position, means to depress said latch arm and release the flag and cam for rotational movement, a cut away portion on the periphery of said cam adjacent said shoulder, and means on said depressing means normally engaging the circular periphery of said cam to prevent downward movement of said depressing means, said depressing means being free to move downwardly when said cutaway portion comes adjacent thereto.

4. In a taximeter, an indicator shaft, a fare indicating dial thereon, a ratchet wheel on said shaft, a pivoted lever, means normally urging the lever downwardly, a pawl on said lever positioned to engage said wheel, an operating shaft, a cam thereon positioned to engage and intermittently elevate said lever when said operating shaft is rotated, whereby said lever is reciprocated, means to rotate said operating shaft, and means to hold said lever from engagement with said cam, including an upstanding pawl, an auxiliary shaft to which said pawl is fixed, an auxiliary lever on said auxiliary shaft, and means on said operating shaft to move said auxiliary lever and shaft to move said pawl, and release said holding means.

5. In a taximeter, an indicator shaft, a fare indicating dial thereon, a ratchet wheel on said shaft, a pivoted lever, means normally urging the lever in one direction, a pawl on said lever positioned to engage said wheel, an operating shaft, means operable by said shaft to normally engage and intermittently move said lever in the opposite direction whereby said lever is reciprocated during rotation of said shaft, a pawl to hold said lever in inoperative position, an auxiliary shaft to which said pawl is fixed, a cam on said operating shaft, a cam engaging lever on said auxiliary shaft and positioned to be engaged by said cam to move said auxiliary shaft and said pawl to thus release said pivoted lever.

HENRY W. WHITE